(12) United States Patent
Oka

(10) Patent No.: US 12,154,395 B2
(45) Date of Patent: Nov. 26, 2024

(54) COMPUTER NETWORKING APPARATUS, INFORMATION PROCESSING APPARATUS, AND INFORMATION PROCESSING METHOD FOR RECOMMENDING A VEHICLE

(71) Applicant: TOYOTA JIDOSHA KABUSHIKI KAISHA, Toyota (JP)

(72) Inventor: Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 260 days.

(21) Appl. No.: 17/838,622

(22) Filed: Jun. 13, 2022

(65) Prior Publication Data
US 2022/0398880 A1     Dec. 15, 2022

(30) Foreign Application Priority Data
Jun. 14, 2021   (JP) ................ 2021-098595

(51) Int. Cl.
*G07C 5/08*     (2006.01)
*B60W 40/09*    (2012.01)
*G07C 5/00*     (2006.01)

(52) U.S. Cl.
CPC ........... *G07C 5/0816* (2013.01); *B60W 40/09* (2013.01); *G07C 5/008* (2013.01); *G07C 5/085* (2013.01); *B60W 2540/30* (2013.01)

(58) Field of Classification Search
CPC ...... G07C 5/0816; G07C 5/008; G07C 5/085; G07C 5/0825; G07C 2205/02; B60W 40/09; B60W 2540/30; G06Q 30/0645; G06Q 30/0627; G06Q 30/0629

USPC ........................................ 701/31.4
See application file for complete search history.

(56) References Cited

U.S. PATENT DOCUMENTS

| | | | |
|---|---|---|---|
| 9,081,944 B2 * | 7/2015 | Camacho | G06F 21/31 |
| 9,499,128 B2 * | 11/2016 | Reh | H04W 4/80 |
| 9,536,254 B1 * | 1/2017 | David | G07C 5/008 |
| 11,120,497 B1 * | 9/2021 | Schumann | G06Q 30/0283 |
| 2007/0299577 A1 | 12/2007 | Hattori et al. | |
| 2008/0082524 A1 | 4/2008 | Inaba et al. | |
| 2013/0325521 A1 * | 12/2013 | Jameel | G06Q 10/02 705/5 |
| 2014/0322676 A1 * | 10/2014 | Raman | G09B 19/167 434/65 |

(Continued)

FOREIGN PATENT DOCUMENTS

| | | |
|---|---|---|
| JP | 2008-1350 A | 1/2008 |
| JP | 2008-84193 A | 4/2008 |

(Continued)

*Primary Examiner* — Andrew R Dyer
(74) *Attorney, Agent, or Firm* — Sughrue Mion, PLLC

(57) ABSTRACT

An information processing apparatus compares a sense of use of a first vehicle with a sense of use of a second vehicle based on first information about one or more automobile components used by a user in the first vehicle that the user has used in the past in the first vehicle and second information about one or more automobile components used by the user in the second vehicle that is a vehicle candidate lent to the user. Then, the information processing apparatus notifies the user of result information related to a result of the comparing the sense of use of the first vehicle with the sense of use of the second vehicle.

17 Claims, 7 Drawing Sheets

(56) References Cited

U.S. PATENT DOCUMENTS

| | | | |
|---|---|---|---|
| 2014/0358896 A1* | 12/2014 | Camacho | G06F 30/15 707/722 |
| 2015/0100505 A1* | 4/2015 | Binion | G06Q 30/0278 701/1 |
| 2019/0080596 A1* | 3/2019 | Suzuki | G08G 1/0962 |
| 2019/0188817 A1* | 6/2019 | Yanagida | G06Q 10/06311 |
| 2019/0244261 A1* | 8/2019 | Sakurada | G06T 7/0002 |
| 2019/0279440 A1* | 9/2019 | Ricci | G06Q 10/20 |
| 2019/0279447 A1* | 9/2019 | Ricci | B60R 25/01 |
| 2019/0287166 A1* | 9/2019 | Mitsumaki | G06Q 30/0645 |
| 2019/0303999 A1 | 10/2019 | Hori et al. | |
| 2019/0304010 A1* | 10/2019 | Mitsumaki | G06Q 30/0631 |
| 2020/0143435 A1* | 5/2020 | Suzuki | A61B 5/6893 |
| 2020/0164886 A1* | 5/2020 | Dutta | G06F 21/64 |
| 2020/0290536 A1 | 9/2020 | Sasaki | |
| 2021/0350339 A1* | 11/2021 | Cattone | G06Q 10/20 |
| 2022/0009525 A1* | 1/2022 | Aiko | G06Q 10/02 |
| 2022/0036666 A1* | 2/2022 | Mondello | G06N 5/04 |
| 2022/0301044 A1* | 9/2022 | Löthman | G06F 16/9536 |

FOREIGN PATENT DOCUMENTS

| | | |
|---|---|---|
| JP | 2019-174978 A | 10/2019 |
| JP | 2020-149117 A | 9/2020 |

\* cited by examiner

UTILIZATION INFORMATION

| VEHICLE ID | DATE AND TIME |
|---|---|
| *** | *** |
|  | ⋮ |
|  | *** |
| ⋮ | ⋮ |
| *** | *** |
|  | ⋮ |
|  | *** |

FIG. 3

| VEHICLE INFORMATION | | | |
|---|---|---|---|
| VEHICLE ID | COMPONENT | DETAIL | LENDING |
| *** | *** | *** | AVAILABLE |
| | ... | ... | |
| | *** | *** | |
| ... | ... | ... | ... |
| *** | *** | *** | NOT POSSIBLE |
| | ... | ... | |
| | *** | *** | |

FIG. 4

UTILIZATION INFORMATION

| VEHICLE ID | DATE AND TIME | EVALUATION |
|---|---|---|
| *** | *** | LEVEL 5 |
|  | ⋮ | ⋮ |
|  | *** | LEVEL 5 |
| ⋮ | ⋮ | ⋮ |
| *** | *** | LEVEL 1 |
|  | ⋮ | ⋮ |
|  | *** | LEVEL 2 |

FIG. 7

COMPUTER NETWORKING APPARATUS, INFORMATION PROCESSING APPARATUS, AND INFORMATION PROCESSING METHOD FOR RECOMMENDING A VEHICLE

CROSS REFERENCE TO THE RELATED APPLICATION

This application claims the benefit of Japanese Patent Application No. 2021-098595, filed on Jun. 14, 2021, which is hereby incorporated by reference herein in its entirety.

BACKGROUND

Technical Field

The present disclosure relates to an information processing apparatus, to an information processing method, and to a non-transitory storage medium.

Description of the Related Art

Patent literature 1 discloses a vehicle search system. In the vehicle search system disclosed in Patent Document 1, the operation characteristic information indicating the driving tendency of the user is compared with the operation feeling characteristic information indicating the operation feeling of each of the plurality of vehicles. In the vehicle retrieval system, a vehicle whose degree of coincidence between the driving tendency of the user and the operating sensory characteristics exceeds thresholds is retrieved from a plurality of vehicles.

Patent literature 1: Japanese Patent Application Laid-Open Publication No. 2019-174978

SUMMARY

It is an object of the present disclosure to provide a technique that allows a user to borrow a vehicle which is easy for user to use.

An information processing apparatus according to a first mode of the present disclosure includes a controller having at least one processor configured to perform:

comparing a sense of use of a first vehicle with a sense of use of a second vehicle based on first information about one or more automobile components used by a user in the first vehicle that the user has used in the past in the first vehicle and second information about one or more automobile components used by the user in the second vehicle that is a vehicle candidate lent to the user; and notifying the user of result information related to a result of the comparing the sense of use of the first vehicle with the sense of use of the second vehicle.

A computer-implemented information processing method according to a second mode of the present disclosure comprises:

comparing a sense of use of a first vehicle with a sense of use of a second vehicle based on first information about one or more automobile components used by a user in the first vehicle that the user has used in the past in the first vehicle and second information about one or more automobile components used by the user in the second vehicle that is a vehicle candidate lent to the user; and notifying the user of result information related to a result of the comparing the sense of use of the first vehicle with the sense of use of the second vehicle.

A non-transitory storage medium according to a third mode of the present disclosure is a non-transitory storage medium for storing a program for causing a computer to perform information processing method, the information processing method comprising:

comparing a sense of use of a first vehicle with a sense of use of a second vehicle based on first information about one or more automobile components used by a user in the first vehicle that the user has used in the past in the first vehicle and second information about one or more automobile components used by the user in the second vehicle that is a vehicle candidate lent to the user; and notifying the user of result information related to a result of comparing the sense of use of the first vehicle with the sense of use of the second vehicle.

This disclosure allows a user to borrow a vehicle that is easy for the user to use.

BRIEF DESCRIPTION OF THE DRAWINGS

FIG. 3 is a diagram illustrating an example of a table configuration of utilization information stored in utilization information database according to the first embodiment;

FIG. 4 illustrates an exemplary table structure of vehicle information stored in a vehicle information database;

FIG. 7 is a diagram illustrating an example of a table configuration of utilization information stored in a utilization information database according to the second embodiment.

DESCRIPTION OF THE EMBODIMENTS

Figure 1:
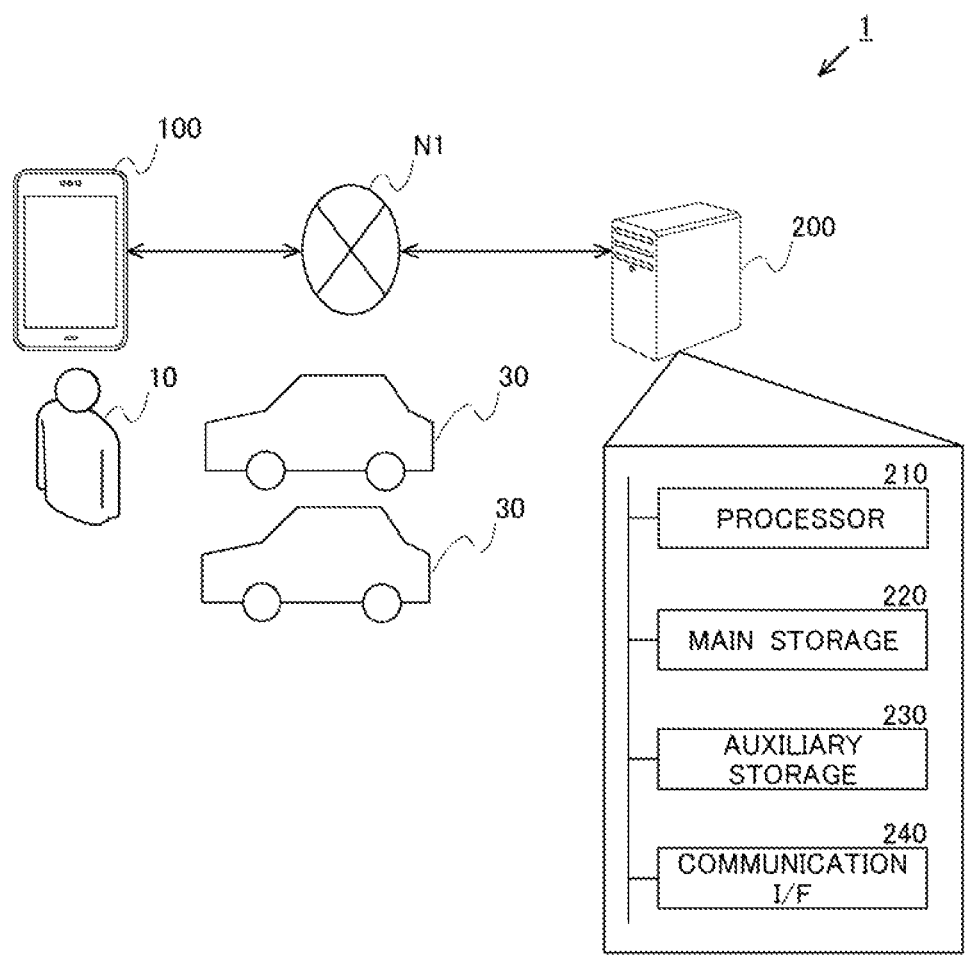
FIG. 1 is a diagram illustrating a schematic configuration of a rental system according to the first embodiment.

A user uses services for borrowing a vehicle. The user can borrow a variety of vehicles by utilizing such services for borrowing vehicles. However, for example, the manufacturer, model, or model number of an automobile component used by the user in a vehicle (hereinafter sometimes referred to simply as "automobile component") may differ depending on the vehicle. It is assumed that sense of use of a vehicle will differ depending on the manufacturer, model, or model number of an automobile component. Also, for example, the automobile component may be placed in a vehicle differently depending on the vehicle. Then, it is assumed that sense of use of a vehicle differs depending on the difference in the arrangement of the automobile component for that vehicle. Therefore, if various vehicles are lent to a user, various vehicles differing in sense of use will be lent to the user. Consequently, the difference in a vehicle's sense of use may interfere with the use of the rented vehicle, such as the mishandling by the user of the automobile component.

Thus, a controller comprising at least one processor in an information processing apparatus according to the first aspect of the present disclosure compares a sense of use of a first vehicle with a sense of use of a second vehicle based on information about one or more automobile components used by the user in the first vehicle and information about one or more automobile components used by the user in the second vehicle. Here, the first vehicle is a vehicle which has been used by the user. The second vehicle is a vehicle which is a candidate vehicle that may be lent to the user. Then, controller notifies the user of the result information related to the result of comparing a sense of use of the first vehicle and a sense of use of the second vehicle.

As described above, the information processing apparatus compares the sense of use of the first vehicle and the sense of use of the second vehicle and notifies the result information to the user. Here, since the user has used the first vehicle in the past, it grasps sense of use of the first vehicle. Therefore, the information processing apparatus can compare sense of use of the first vehicle, for which the user knows sense of use, with sense of use of the second vehicle, which is the candidate vehicle that may be lent to the user. The information processing apparatus allows the user to comprehend the results of comparing sense of use of the first vehicle, for which the user is aware, with sense of use of the second vehicle that is a candidate vehicle to be lent to the user. Then, if a plurality of candidate second vehicles are compared, the user can select the second vehicle with smaller differences between sense of use and sense of use in the first vehicle, as vehicle to be rented. Thus, the information processing apparatus allows user to select and borrow a vehicle that is easy to use among the plurality of candidate second vehicles.

Hereinafter, specific embodiments of the present disclosure will be described with reference to the drawings. The dimensions, materials, shapes, relative arrangements, and the like of the components described in the present embodiment are not intended to limit the technical scope of the present disclosure to these alone unless otherwise specified.

First Embodiment (Outline of System)

A rental system 1 in the present embodiment will be described with reference to FIG. 1. FIG. 1 is a diagram illustrating a schematic configuration of a rental system 1 according to the present embodiment. The rental system 1 includes a user terminal 100 and management server 200. In rental system 1, user terminal 100 and management server 200 are interconnected by network N1. Network N1 may be, for example, a WAN (Wide Area Network) which is a worldwide public communication network such as the Internet, or a telephone communication network such as a mobile phone.

(User Terminal)

User terminal 100 is terminal used by user 10. User terminal 100 may be, for example, a computer or a portable information terminal. User 10 is a user that uses a rental service. Here, rental service is a service for lending or renting a vehicle 30 to a user. The rental service may be, for example, a service that provides car sharing to users. When using the rental service, user 10 uses user terminal 100 to transmit information for requesting the rental of vehicle (hereinafter, sometimes referred to as "request information") to management server 200 via network N1.

User 10 uses the user terminal 100 to utilize the rental service. A plurality of manufacturers of vehicles 30 which can be selected as a vehicle to be lent by user 10 in rental service may not be all the same manufacturers. In this instance, an automobile component used by a user when using the vehicle 30 (hereinafter, sometimes simply referred to as "automobile component") may differ depending on the vehicle 30. In addition, even if several vehicles 30 are all from the same manufacturers, the automobile component may differ between the vehicles 30 due to differences in the vehicle type or vehicle model specified by the manufacturer.

Here, an automobile component is, for example, various switches such as a wiper switch, an illumination switch, a hazard switch, an ignition switch (power switch), etc. Further, an automobile component includes, for example, rear-view mirrors, and various other mirrors such as side mirrors. An automobile component may be, for example, various instruments such as a speedometer, a car navigation system, a drink holder, or the like.

For example, the operation feeling and the like of the switches may be different in the various vehicles due to different shapes, loads required for the operation, and the like. Then, the user 10 may mistake the operation of the switches due to a difference in the operation feeling. In addition, the mirrors may have different views due to different shapes and the like. Then, the user 10 may miss an object or the like in the mirror due to the difference in the appearance of the mirror or the like.

In addition, various instruments may differ in their views, etc., due to their different shapes or display ranges of measured values, etc. The user 10 may mistake the displays of the various instruments due to the differences in the views of the various instruments. In addition, the operation method of car navigation systems may differ depending on the manufacturer, model, or model number, etc. Thus, the user 10 may mistakenly operate the car navigation system due to a difference in operating methods. In addition, the drink holder may have different shapes or the like, and thus may have different usability such as the size or the number of the containers of the beverage that can be held. User 10 may then be unable to place the drink container in the drink holder.

Thus, if an automobile component installed in vehicle 30 differs, the automobile component may differ in how it is viewed, operated, or used. Therefore, sense of use when the user 10 uses a vehicle differs from vehicle to vehicle because the automobile component mounted on the vehicle differs. In other words, the difference in vehicle 30's automobile component may affect sense of use of the vehicle 30.

In such cases, if various vehicles 30 are lent to the user 10, there is a possibility that the use of vehicle 30 is hindered, for example, when user 10 erroneously operates an automobile component due to the difference in the automobile component. On the other hand, when a vehicle 30 is lent to a user 10, whose sense of use is similar to that of a vehicle 30 having a sense of use that is already grasped by user 10, it is possible to suppress the occurrence of a problem in the use of vehicle 30 by user 10. That is, by lending a vehicle to the user which has similar automobile component configurations to vehicles that the user already grasps, it is possible to reduce the chances that the user will experience problems.

(Management Server)

Management server 200 is a server that manages a rental service. Management server 200 performs a procedure for lending a vehicle 30 to the user 10. Management server 200 proposes a vehicle 30 to lend to the user 10. Details of how the management server 200 proposes a vehicle 30 to lend to the user 10 will be described later.

The management server 200 comprises a computer having a processor 210, a main storage 220, an auxiliary storage 230, and a communication I/F (communication interface) 240. The processor 210 is, for example, a CPU (Central Processing Unit) or a DSP (Digital Signal Processor). The main storage 220 is, for example, RAM (Random Access Memory). The auxiliary storage 230 is, for example, ROM (Read Only Memory). The auxiliary storage 230 is, for example, an HDD (Hard Disk Drive) or a disc recording medium such as a CD-ROM, DVD disc, or Blu-ray disc. The auxiliary storage 230 may also be a removable medium (portable storage medium). Examples of removable media include a USB memory or an SD card. The communication FF240 may be, for example, a LAN (Local Area Network) interface board or wireless communication circuitry for wireless communication.

In the management server 200, the auxiliary storage 230 stores an operating system (OS), various programs, various information tables, and the like. Further, in the management server 200, the processor 210 loads the program stored in the auxiliary storage 230 into the main storage 220 and executes the program, thereby realizing various functions as described later. However, some or all of the functions of the management server 200 may be implemented by a hardware circuit such as a ASIC or a hardware circuit such as a FPGA. Additionally, the management server 200 does not necessarily have to be achieved by a single physical configuration, and may be formed by a plurality of computers operating in coordination.

(Function Configuration)

Figure 2:
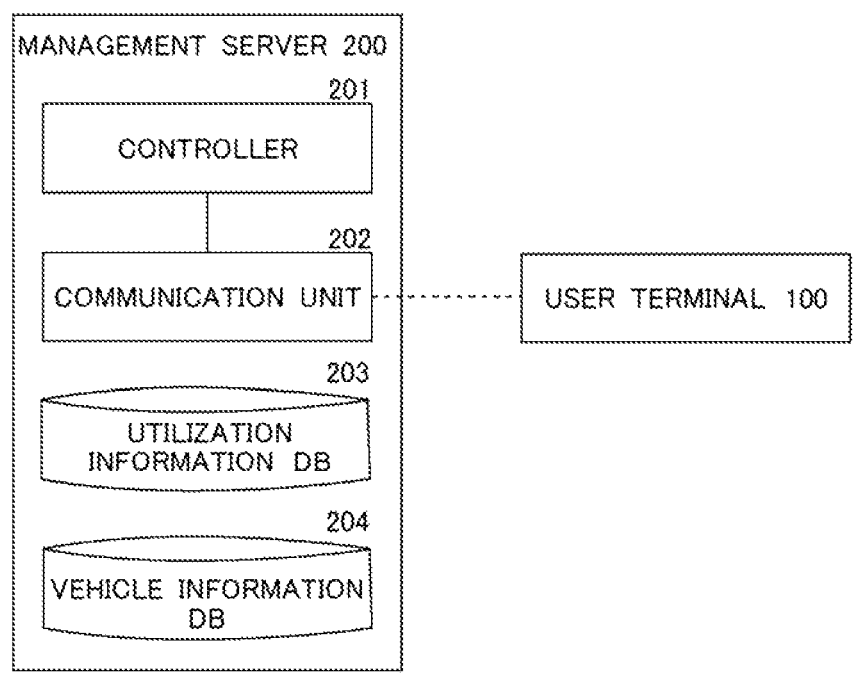
FIG. 2 schematically illustrates an exemplary functional configuration of a management server.

Next, the functional configuration of each management server 200 for the rental system 1 according to the present embodiment will be described with reference to FIGS. 2 to 4. FIG. 2 schematically illustrates an exemplary functional configuration of the management server 200.

The management server 200 includes a controller 201, a communication unit 202, a utilization information database 203 (utilization information DB203), and a vehicle information database 204 (vehicle information DB204). The controller 201 has a function of performing an arithmetic process for controlling the management server 200. The controller 201 can be implemented by the processor 210 in the management server 200. The communication unit 202 is capable of connecting the management server 200 to network N1. The communication unit 202 can be implemented by a communication FF240 in the management server 200.

Utilization information DB203 has a function for storing utilization information. Utilization information DB 203 can be implemented by the auxiliary storage 230 in the management server 200. FIG. 3 is a diagram illustrating an example of a table configuration of utilization information stored in utilization information DB203 according to the present embodiment. Utilization information is information of the usage history of rental service of user 10. As illustrated in FIG. 3, utilization information has a vehicle ID field and a date and time field. Identifiers (vehicle IDs) for specifying vehicle 30 previously used by user 10 are entered in vehicle ID fields. The date and time field contains the date and time when the user 10 previously used a vehicle 30 corresponding to a vehicle ID entered in a vehicle ID field.

Vehicle information database 204 has a function of storing vehicle information. Vehicle information database 204 can be implemented by a supplementary storage 230 in management server 200. FIG. 4 illustrates an exemplary table structure of vehicle information stored in the vehicle information database 204. Vehicle information is information for a vehicle 30 lent to a user by the rental service. As illustrated in FIG. 4, vehicle information has vehicle ID fields, a component field, a detail field, and a lending field.

Identifiers (vehicle IDs) for specifying a vehicle 30 to be lent in the rental service are entered in vehicle ID fields. Here, the vehicle ID field also includes a vehicle ID of vehicle 30 which has been used by the user 10. Information about the type of automobile component mounted on a vehicle 30 is inputted to the component field. The names of the automobile component such as various switches, various mirrors, various instruments, or car navigation systems described above are entered into the component field.

The detail field contains detailed information about each automobile component. For example, a manufacturer name, a model name, a model number, or the like for specifying the respective automobile component is inputted to the detail field. This allows the controller 201 to learn more about an automobile component of the respective vehicle 30. Information as to whether or not vehicle 30 corresponding to a vehicle ID entered in the vehicle ID field can be lent is entered in the lending field. Here, the state in which vehicle 30 can be lent is a state in which vehicle 30 can be lent to the user of the rental service because it has not been lent to the user of the rental service. If a vehicle 30 is lendable, "Available" is inputted to lending field. If a vehicle 30 is not lendable, "not possible" is inputted to lending field. As a result, the controller 201 can determine whether or not the respective vehicle 30 can be lent.

The controller 201 receives the request information from the user terminal 100 via the communication unit 202. Here, it is assumed that a vehicle 30 which has been used by the user 10 in the past is a vehicle in which the user 10 has grasped a sense of use. Therefore, the controller 201 determines a specific vehicle 30 from among the vehicles 30 which has been used by user 10 based on utilization information stored in the utilization information database 203. Here, controller 201 determines the specific vehicle 30 as a vehicle 30 which the user 10 has the sense of use.

Specifically, from utilization information stored in utilization information database 204, controller 201 determines, as a specific vehicle 30, the vehicle 30 that has been previously used by user 10 in the rental service. At this time, it is assumed that a vehicle 30 having the largest number of times the user 10 has used in the rental service is a vehicle in which user 10 has grasped a sense of use. Therefore, controller 201, for example, determines a vehicle 30, that has been utilized the most number of times by the user 10, as the specific vehicle 30. Therefore, controller 201, for example, determines vehicle 30, which has the most number of times utilized by user 10, as specific vehicle 30.

If controller 201 determines a specific vehicle 30 based on the usage history of the rental service of the user 10, it is not necessarily required to determine vehicle 30 that user 10 has used in rental service the largest number of times as specific vehicle 30. For example, it is also assumed that vehicle 30 used by user 10 last time in rental service is a vehicle in which user 10 grasps sense of use. Thus, controller 201 may determine, for example, that the vehicle 30 used by user 10 last time in the rental service as the specific vehicle 30.

Controller 201 determines whether or not a specific vehicle 30 can be lent based on vehicle information stored in vehicle information database 204. If a specific vehicle 30 is lendable, controller 201 sends a suggestion information to the user terminal 100 proposing to borrow specific vehicle 30. Also, controller 201 performs a process for proposing to user 10 another vehicle 30 that is similar in sense of use and sense of use of specific vehicle 30 when specific vehicle 30 is not in a lendable state.

Controller 201 acquires information (hereinafter, sometimes referred to as "specified information") about the respective automobile components of the specific vehicle 30 from vehicle information stored in the vehicle information database 204. Specifically, controller 201 acquires the name of each automobile component and the detailed information about each automobile component of the vehicle corresponding to the vehicle ID of the specific vehicle 30 as specified information from vehicle information.

Controller 201 compares the acquired specified information with information for each automobile component of each candidate vehicle 30 in vehicle information stored in vehicle information database 204. Here, candidate vehicle 30 is a vehicle 30 which is among the candidates to be lent to user 10. Controller 201 specifies, as candidate vehicle 30, vehicle 30 in which "Available" is entered in the lending field in vehicle information stored in the vehicle information database 204. That is, controller 201 identifies vehicle 30 that is ready to be lent to the user of the rental service as candidate vehicle 30.

Here, it is assumed that the greater the number of automobile components that match the manufacturer, model, or model number between each automobile component of a specific vehicle 30 and each automobile component of a candidate vehicle 30, the greater the similarity between sense of use of a specific vehicle 30 and sense of use of a candidate vehicle 30. Therefore, controller 201 calculates, for example, the number of automobile components that matches the manufacturer, model or model number for each automobile component of specific vehicle 30 and each automobile component of candidate vehicle 30 as the similarity of sense of use between specific vehicle 30 and candidate vehicle 30. Controller 201 compares sense of use of specific vehicle 30 and sense of use of candidate vehicle 30 based on sense of use similarities between specific vehicle 30 and candidate vehicle 30. Controller 201 determines, as suggested vehicle 30, candidate vehicle 30 having the highest similarity between sense of use and sense of use of specific vehicle 30 among candidate vehicles 30. Suggested vehicle 30 is a vehicle that is propose to the user 10 to borrow.

The processes for determining a suggested vehicle 30 may not necessarily be determined based on the numbers matched by the manufacturer of automobile component or the like. Controller 201 may, for example, determine vehicle 30 to which a particular automobile component in a specific vehicle 30 matches as the suggested vehicle 30.

(Proposal Processing)

Figure 5:
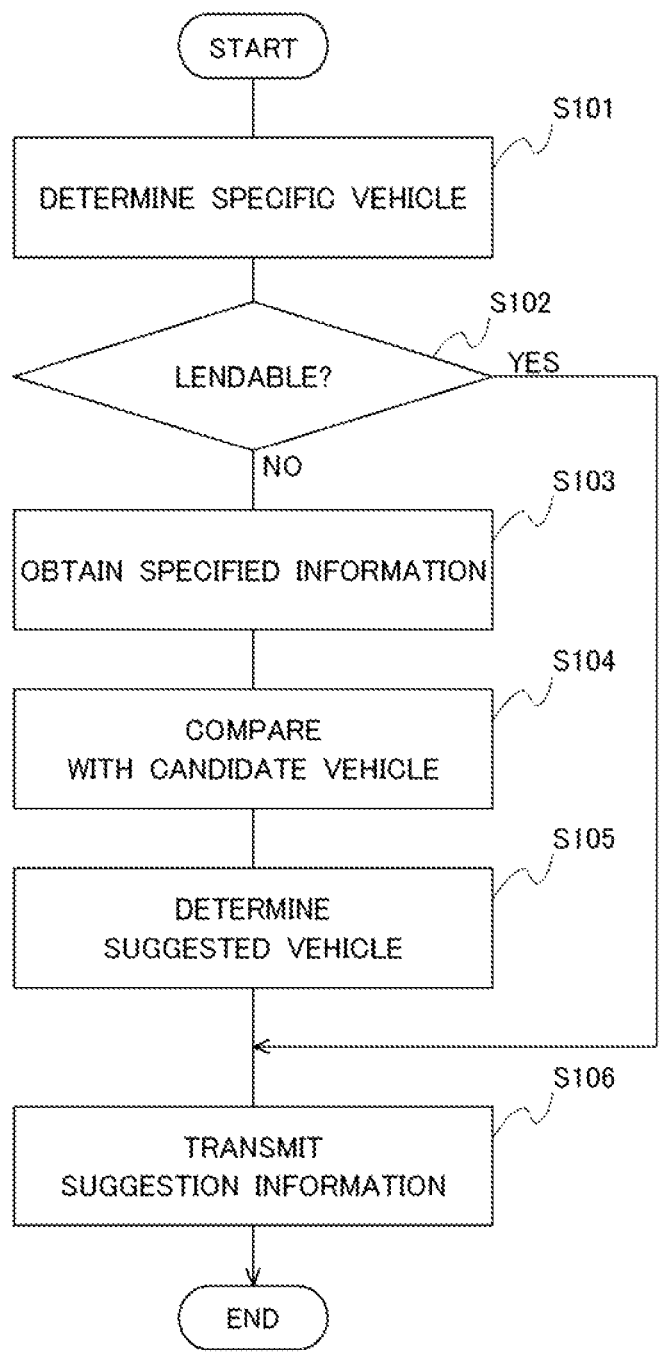
FIG. 5 is a flow chart of proposal processing.

Next, proposal processing executed by controller 201 in management server 200 in the rental system 1 according to the present embodiment will be described with reference to FIG. 5. FIG. 5 is a flow chart of proposal processing. Proposal processing is a process for proposing the suggested vehicle 30 to the user 10. Proposal processing starts running when the management server 200 receives a request information from the user terminal 100.

In the proposal processing, first, in S101, specific vehicle 30 is determined. Specific vehicle 30 determines, as specific vehicle 30, the vehicle 30 that has been used most frequently by the user 10 based on utilization information stored in utilization information database 203. Next, in S102, it is determined whether or not the specific vehicle 30 is lendable based on vehicle information stored in the vehicle information database 204. If an affirmative determination is made in S102 (specific vehicle 30 is lendable), a suggestion information is sent to user terminal 100. Suggestion information sent in the process of S102 is information proposing to borrow the specific vehicle 30.

If a negative determination is made in S102 (specific vehicle 30 is not lendable), then in S103, specified information is obtained from the vehicle information stored in vehicle information database 204. Next, in S104, based on specified information and vehicle information stored in vehicle information DB204, sense of use of specific vehicle 30 is compared with sense of use of the respective candidate vehicle 30. Next, in S105, candidate vehicle 30 having the highest similarity of sense of use of specific vehicle 30 is determined as suggested vehicle 30. Then in S106, a suggestion information is sent to user terminal 100. Suggestion information transmitted in S106 process includes information to propose borrowing suggested vehicle 30 as a consequence of comparing sense of use of specific vehicle 30 with sense of use of the respective candidate vehicle. Proposal processing is then terminated.

As described above, the candidate vehicle 30 having the highest similarity with sense of use of specific vehicle 30 is determined as the suggested vehicle 30 by the management server 200 in the rental system 1. It is proposed that suggested vehicle 30 be lent to user 10. This allows user 10 to borrow vehicle 30, which is the most similar in sense of use to the specific vehicle 30, which the user grasps the sense of use, since they used it in the past among a plurality of candidate vehicles 30. In this way, the rental system 1 allows the user to borrow a vehicle that is easy for user 10 to use.

(Example Modification 1)

In the present embodiment, the management server 200 determines a specific vehicle 30 based on the usage history of rental service of user 10. However, the management server 200 does not necessarily need to determine a specific vehicle 30 based on the rental service usage history of user 10. Specific vehicle 30 may be, for example, a vehicle 30 chosen by the user 10. In this instance, user 10 utilizes the user terminal 100 to designate a vehicle 30, which has been used in the past and that the user has grasped the sense of use, as the specific vehicle 30 to be lent. The user terminal 100 sends a request information to the management server 200 containing information for the specified specific vehicle 30. Then, the management server 200 compares sense of use of the chosen specific vehicle 30 with sense of use of the respective candidate vehicle 30 to determine a suggested vehicle 30.

(Example Modification 2)

In the present embodiment, the management server 200 determines the suggested vehicle 30 from a plurality of candidate vehicles 30 in the vehicle information stored in vehicle information database 204. However, the management server 200 does not necessarily need to determine a suggested vehicle 30 from a plurality of candidate vehicles 30 in the vehicle information stored in vehicle information database 204. In this instance, user 10 utilizes the user terminal 100 to choose a candidate vehicle 30 that the user 10 wishes to borrow. The user terminal 100 then sends a request information to management server 200 containing information for the specified candidate vehicle 30.

The management server 200 compares sense of use of specific vehicle 30 with sense of use of the specified candidate vehicle 30 based on vehicle information stored in the vehicle information database 204. The management server 200 then transmits to the user terminal 100 information (hereinafter sometimes referred to as "result information") relating to the result of comparing sense of use of the specific vehicle 30 with sense of use of the designated candidate vehicle 30. Where result information contains, for example, information about sense of use of a specific vehicle 30 and sense of use similarity of the specified candidate vehicle 30. In addition, result information may include information on portions different from each other between an automobile component of a specific vehicle 30 and an automobile component of a candidate vehicle 30. As a result, the user 10 can grasp sense of use of the candidate vehicle 30 specified by itself and sense of use of the specific vehicle 30 for which the user 10 grasps sense of use. This allows the user 10 to choose a vehicle 30 with less differences between specific vehicle 30 and sense of use. In this way, rental system 1 allows user to borrow vehicles that are easy for the user 10 to use.

(Example Modification 3)

In this embodiment, management server 200 compares sense of use of specific vehicle 30 and sense of use of candidate vehicle 30 by comparing the manufacturer name, model, or model number, etc. of the automobile component of the specific vehicle 30 with the manufacturer name, model, or model number, etc. of the automobile component of the candidate vehicle 30. However, the management server 200 may not necessarily compare sense of use of the specific vehicle 30 with sense of use of the candidate vehicle 30 by comparing the manufacturer name, model, or model number, etc. of automobile component of the specific vehicle 30 with the manufacturer name, model, or model number, etc. of the automobile component of the candidate vehicle 30.

For example, it is assumed that sense of use of a vehicle differs from vehicle to vehicle because automobile components are arranged differently in the vehicle depending on the vehicle. In other words, if the arrangement of automobile components are similar to each other in the vehicle, it is assumed that sense of use of the vehicles are similar. Therefore, the management server 200, for example, based on the arrangement of the respective automobile components between the specific vehicle 30 and the candidate vehicle 30, comparing sense of use and candidate vehicle 30 of specific vehicle 30 may determine suggested vehicle 30.

In this instance, the information about location of each automobile component is inputted to the detail field as vehicle information stored in vehicle information database 204. Then, management server 200 compares the arrangement of each automobile component of the specific vehicle 30 and the candidate vehicle 30, and calculates the similarity (hereinafter, sometimes referred to as "arrangement similarity") of the arrangement of each automobile component. Then, management server 200 calculates arrangement similarity between specific vehicle 30 and candidate vehicle 30 as the similarity of sense of use between specific vehicle 30 and candidate vehicle 30. At this time, the more similar the arrangement of the respective automobile component of specific vehicle 30 and candidate vehicle 30, the higher the similarity of the arrangement of the respective automobile component. That is, the similarity of the specific vehicle 30 and the candidate vehicle 30 sense of use becomes higher as the arrangement of the respective automobile component of the specific vehicle 30 and the candidate vehicle 30 becomes more similar. Management server 200 determines vehicle with the highest similarity of sense of use between the specific vehicle 30 and the candidate vehicle 30 as suggested vehicle 30. This will prevent the user 10 from using the vehicle 30 that has a different sense of use due to a different arrangement of automobile components than the specific vehicle 30.

Second Embodiment

In the first embodiment, based on the utilization history of rental service by the user 10, a vehicle 30 used the most number of times by the user 10 is utilized for the rental service as specific vehicle 30. On the other hand, in the present embodiment, a suggested vehicle 30 is determined based on information about the operation of user 10 in a plurality of vehicles 30 previously used by user 10. The following description below only focusses on the differences from the first embodiment.

Figure 6:
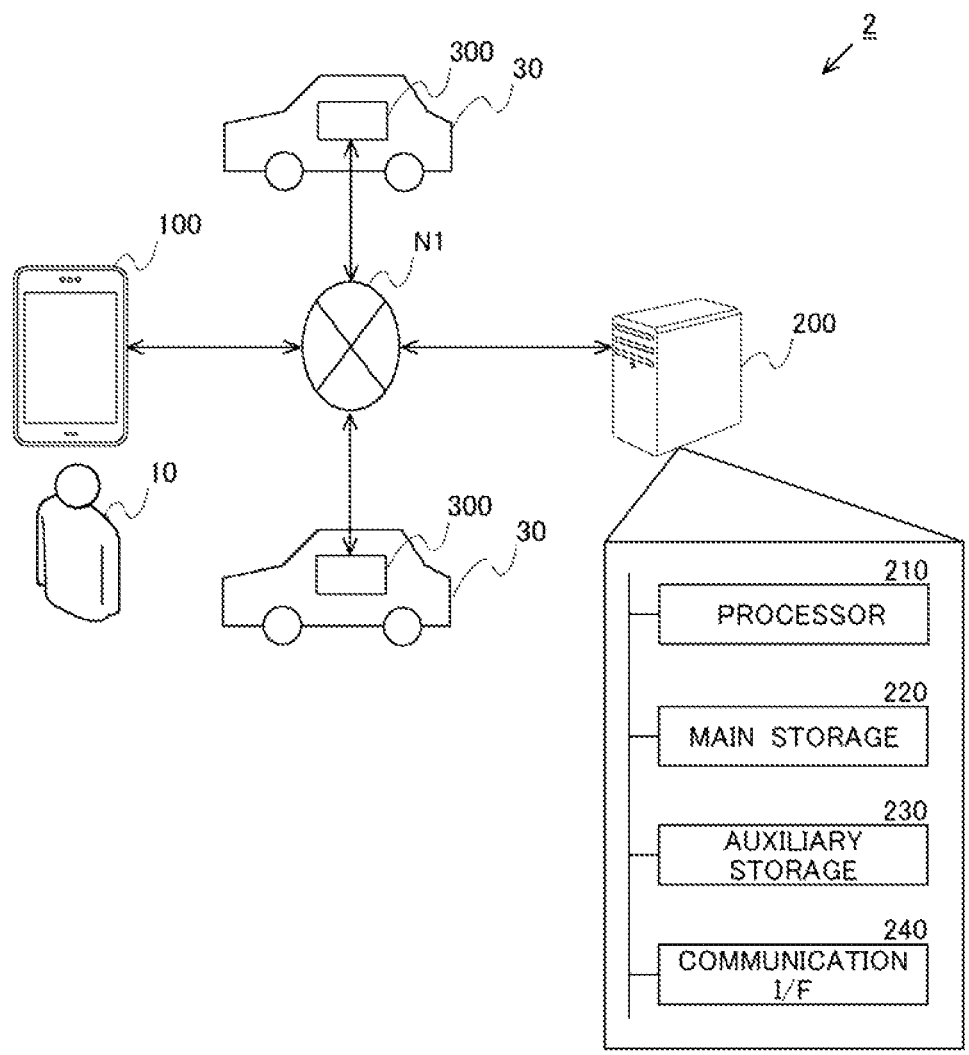
FIG. 6 is a diagram illustrating a schematic configuration of a rental system according to the present exemplary embodiment.

Rental system 2 in the present embodiment will be described with reference to FIG. 6. FIG. 6 is a diagram illustrating a schematic configuration of a rental system 2 according to the present exemplary embodiment. The rental system 2 includes a user terminal 100, a management server 200, and a plurality of cameras 300. In the rental system 2, the user terminal 100, the management server 200, and the cameras 300 are interconnected by network N1.

(Camera)

Camera 300 is a camera provided for imaging within vehicle 30. The cameras 300 are provided on each of the plurality of vehicles 30 lent in the rental service. At this time, the moving image the camera 300 captures may include the operation of a user 10 using a vehicle 30. The camera 300 transmits a video image including the operation of user 10 utilizing vehicle 30 to management server 200 via network N1.

(Functional Configuration)

In the management server 200, the controller 201 receives a video image from the camera 300 by the communication unit 202. The controller 201 determines whether or not the user 10 can smoothly utilize vehicle 30 based on the received video image. When the controller 201 detects, for example, that the user 10 is performing an operation such as searching for a switch by the image recognizing process, it is determined that user 10 is not smoothly utilizing vehicle 30. In this manner, the controller 201 extracts the state of the operation of the user 10 while using vehicle 30 based on the video image received from the cameras 300. Then, controller 201 evaluates the operation when vehicle 30 is utilized by user 10 based on the operation of user 10 in the extracted vehicle 30. At this time, if user 10 is not able to smoothly use vehicle 30, controller 201 evaluates the operation to be low. Controller 201 stores in utilization information DB203 information for evaluating the operation when user 10 utilizes vehicle 30.

FIG. 7 is a diagram illustrating an example of a table configuration of utilization information stored in utilization information DB203 according to the present embodiment. As illustrated in FIG. 7, utilization information includes the vehicle identification field, the date and time field, and the evaluation field. In the evaluation field, the evaluation of the operation when user 10 utilizes the respective vehicle 30 at the date and time entered in the date and time field is entered. Here, the evaluation of the operation is divided, for example, from Level 5 (vehicle 30 is available without delay) to Level 1 (the operation of vehicle 30 is not possible).

The controller 201 determines a specific vehicle 30 based on the assessment of the operation when the user 10 in utilization information stored in utilization information DB203 utilizes vehicle 30. More specifically, the controller 201 determines, as specific vehicle 30, a vehicle 30 having the highest performance among vehicles 30 previously used by the user 10. When a vehicle 30 is used several times in the past by the user 10, a specific vehicle 30 is determined based on the average of the evaluation of several previous operations. Then, the controller 201, as in the first embodiment, compares a sense of use of candidate vehicle 30 and a sense of use of specific vehicle 30 to determine a suggested vehicle 30.

As described above, in the present embodiment, the management server 200 determines a specific vehicle 30 based on the video image captured by the camera 300. This enables the user 10 to propose, as a suggested vehicle 30, a vehicle 30 which is similar in sense of use to a specific vehicle 30 which the user 10 has been able to smoothly use. Even in this way, the user 10 can borrow a vehicle that is easy to use.

(Example Modification 1)

In the present embodiment, the management server 200, based on the video image captured by the vehicle 30, evaluates the operation of the user 10. However, management server 200 may not necessarily evaluate the operation of the user 10 based on the moving image captured by the vehicle 30. The management server 200 may, for example, evaluate the operation of the user 10 by receiving information relating to the operation of the user 10 from vehicle 30 utilized by the user 10.

In this case, for example, a control signal generated when an automobile component in a vehicle 30 is used, is transmitted to management server 200 from the vehicle 30. Here, if the user 10 is not able to smoothly operate an automobile component of the vehicle 30, it is assumed that the correct operation will fail and the user operation for automobile component will be repeated. In this case, the number of times the management server 200 receives the control signal is more than a predetermined number of times. Also, if the user 10 is not able to smoothly operate an automobile component of the vehicle 30, it may take longer to operate automobile component. For example, if the user 10 is not able to smoothly operate the car navigation system, the time to operate the car navigation system may be longer than a predetermined time. Thus, if the user 10 is not able to smoothly operate the automobile component, the timing at which management server 200 receives the control signal is slower than the predetermined timing. In this instance, the period during which the management server 200 receives control signals from the car navigation system is longer than a predetermined period.

Therefore, management server 200 based on the number of times of or the timing of the control signal received from vehicle 30, evaluates the operation at vehicle 30 of the user 10. In this manner, as in the second embodiment, vehicle 30 having a sense of use similar to that of vehicle 30 which user 10 has been able to utilize without any delay can be proposed as suggested to vehicle 30 to by user 10.

Other Embodiments

The above-described embodiment is merely an example, and the scope of the disclosure may be appropriately modified and practiced without departing from the gist thereof. The processes and means described in the present disclosure may be freely combined and embodied to the extent that no technical conflicts exist.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure can also be implemented by supplying a computer program that implements the functions described in the above-described embodiments to a computer, and reading and executing the program by one or more processors of the computer. Such computer programs may be provided to the computer by a non-transitory computer-readable storage medium that can be connected to a system bus of the computer, or may be provided to the computer through a network. Non-temporary computer-readable storage media include any type of media suitable for storing electronic instructions, such as, for example, magnetic disks (floppy disks, or hard disk drives (HDDs)), optical disks (CD-ROM, DVD disks, or Blu-ray disc-ray disks, etc.), read-only memory (ROM), random access memory (RAM), EPROM, EEPROM, magnetic cards, flash memory, or optical cards.

What is claimed is:

1. A computer-implemented information processing method, comprising:
    acquiring, from a database, operation information relating an operation by a user of a plurality of vehicles previously lent to the user;
    determining a first vehicle from the plurality of vehicles based on the operation information, wherein the operation information indicates a calculated performance level of the user in operating a plurality of components of the plurality of vehicles;
    acquiring, from the database, first information comprising:
        a first type of one or more first automobile components in the first vehicle, or
        a first arrangement of the one or more first automobile components;
    acquiring, from the database, second information comprising:
        a second type of one or more second automobile components in a second vehicle that is a candidate vehicle to lend to the user, or
        a second arrangement of the one or more second automobile components;
    determining result information based on comparing the first information with the second information; and
    transmitting the result information to a user terminal,
    wherein the operation information comprises image information acquired by a camera mounted in one or more of the plurality of vehicles,
    wherein the acquiring operation information comprises capturing, from the camera, a plurality of images of the user, and
    wherein the determining the first vehicle comprises:
        based on the plurality of images, determining one or more delays for the user to operate one or more of the plurality of components; and
        determining the calculated performance level based on the one or more delays.

2. The computer-implemented information processing method of claim 1, wherein the first information comprises first manufacturer information, first model information, or first model number information of the one or more first automobile components, and
    wherein the second information comprises second manufacturer information, second model information, or second model number information of the one or more second automobile components.

3. The computer-implemented information processing method as claimed in claim 2, wherein the comparing the first information with the second information comprises calculating at least one of a number of matching manufacturers, a number of matching models, or a number of matching model numbers of the one or more first automobile components and the one or more second automobile components to obtain a degree of similarity between the first type and the second type as the result information.

4. The computer-implemented information processing method as claimed in claim 1, wherein the first information for the one or more first automobile components comprises first arrangement information relating to the first arrangement, and wherein the second information comprises second arrangement information relating to the second arrangement.

5. The computer-implemented information processing method as claimed in claim 4, wherein the comparing the first information with the second information comprises calculating a degree of similarity between the first arrangement information and the second arrangement information.

6. An information processing apparatus comprising:
a controller having at least one processor; and
memory storing instructions that, when executed by the at least one processor, cause the information processing apparatus to:
  acquire, from a database, operation information relating an operation by a user of a plurality of vehicles previously lent to the user, wherein the operation information indicates a calculated performance level of the user in operating a plurality of components of the plurality of vehicles;
  determine a first vehicle from the plurality of vehicles based on the operation information;
  acquire, from the database, first information comprising:
    a first type of one or more first automobile components in the first vehicle, or
    a first arrangement of the one or more first automobile components;
  acquire, from the database, second information comprising:
    a second type of one or more second automobile components in a second vehicle that is a candidate vehicle to lend to the user, or
    a second arrangement of the one or more second automobile components;
  determine result information based on comparing the first information with the second information; and
  transmit the result information to a user terminal,
wherein the operation information comprises image information acquired by a camera mounted in one or more of the plurality of vehicles,
wherein the camera is configured to capture an image of the operation of the user, and
wherein the controller is configured to execute the instructions to:
  capture from the camera a plurality of images of the user;
  based on the plurality of images, determine one or more delays for the user to operate one or more of the plurality of components; and
  determine the calculated performance level based on the one or more delays.

7. The information processing apparatus as claimed in claim 6, wherein the first information comprises first manufacturer information, first model information, or first model number information of the one or more first automobile components, and wherein the second information comprises second manufacturer information, second model information, or second model number information of the one or more second automobile components.

8. The information processing apparatus as claimed in claim 7, wherein the controller is configured to execute the instructions to compare the first type with the second type by calculating at least one of a number of matching manufacturers, a number of matching models, or a number of matching model numbers of the one or more first automobile components and the one or more second automobile components to obtain a degree of similarity between the first type and the second type as the result information.

9. The information processing apparatus as claimed in claim 6, wherein the first information for the one or more first automobile components comprises first arrangement information relating to the first arrangement, and wherein the second information comprises second arrangement information relating to the second arrangement.

10. The information processing apparatus as claimed in claim 9, wherein the controller is configured to execute the instructions to calculate a degree of similarity between the first arrangement information and the second arrangement information.

11. The information processing apparatus as claimed in claim 10, wherein the first arrangement information comprises first location information of the one or more first automobile components and the second arrangement information comprises second location information of the one or more second automobile components, and wherein the controller is configured to execute the instructions to determine the degree of similarity between the first arrangement information and the second arrangement information based on the first location information and the second location information.

12. The information processing apparatus as claimed in claim 6, wherein the second vehicle is specified by the user.

13. The information processing apparatus as claimed in claim 6, wherein the controller is configured to execute the instructions to compare, based on a plurality of second vehicles being present in the database, the first information and third information of each of the plurality of second vehicles comprising a third type of one or more third automobile components or a third arrangement of the one or more third automobile components; and notify the user of similarity information for the second vehicle having a highest degree of similarity between a plurality of third types or a plurality of third arrangements and the first type or the first arrangement as the result information.

14. The information processing apparatus as claimed in claim 6, wherein each of the plurality of components are configured to generate a control signal when operated, wherein the operation information comprises control signal information based on one or more control signals received from one or more of the plurality of components, and wherein the performance level is based on at least one of a number of control signals received for each of one or more first components of the plurality of components or a timing of control signals received for each of the one or more first components of the plurality of components.

15. The information processing apparatus as claimed in claim 14, wherein a first performance level of the user for a second component of the one or more first components is determined from among a plurality of performance levels, wherein a highest performance level of the plurality of performance levels corresponds to a first control signal of the second component being received less than a first predetermined number of times, and wherein a lowest performance level of the plurality of performance levels corresponds to the first control signal being received more than a second predetermined number of times.

16. The information processing apparatus as claimed in claim 14, wherein a first performance level of the user for a second component of the one or more first components is determined from among a plurality of performance levels,
wherein a highest performance level of the plurality of performance levels corresponds to a first control signal of the second component being received for shorter than a first predetermined period, and
wherein a lowest performance level of the plurality of performance levels corresponds to the first control signal being received for longer than a second predetermined period.

17. The information processing apparatus as claimed in claim 6, wherein a first performance level of the user for a first component of the plurality of components is determined from among a plurality of performance levels,
wherein a highest performance level of the plurality of performance levels corresponds to no delay in operating the first component by the user, and
wherein a lowest performance level of the plurality of performance levels corresponds to inoperability of the first component by the user.

* * * * *